United States Patent
Bajaj

(10) Patent No.: US 7,762,871 B2
(45) Date of Patent: Jul. 27, 2010

(54) PAD CONDITIONER DESIGN AND METHOD OF USE

(76) Inventor: Rajeev Bajaj, 43651 Skye Rd., Fremont, CA (US) 94539

(*) Notice: Subject to any disclaimer, the term of this patent is extended or adjusted under 35 U.S.C. 154(b) by 0 days.

(21) Appl. No.: 11/369,876

(22) Filed: Mar. 6, 2006

(65) Prior Publication Data

US 2006/0199471 A1 Sep. 7, 2006

Related U.S. Application Data

(60) Provisional application No. 60/659,384, filed on Mar. 7, 2005.

(51) Int. Cl.
*B24B 1/00* (2006.01)
*B23K 26/00* (2006.01)

(52) U.S. Cl. .......... 451/56; 451/443; 219/121.6; 219/121.62; 219/121.68; 219/121.69

(58) Field of Classification Search .......... 451/56, 451/443, 54, 55; 219/121.6, 121.61, 121.68, 219/121.69, 121.62, 121.66, 121.67
See application file for complete search history.

(56) References Cited

U.S. PATENT DOCUMENTS

| | | | |
|---|---|---|---|
| 5,212,910 A | 5/1993 | Breivogel et al. | |
| 5,489,233 A | 2/1996 | Cook et al. | |
| 5,607,346 A | 3/1997 | Wilson et al. | |
| 5,609,517 A | 3/1997 | Lofaro | |
| 5,795,218 A | 8/1998 | Doan et al. | |
| 5,893,976 A | 4/1999 | Bauer | |
| 6,019,666 A | 2/2000 | Roberts et al. | |
| 6,024,630 A | 2/2000 | Shendon et al. | |
| 6,089,965 A | 7/2000 | Otawa et al. | |
| 6,090,475 A | 7/2000 | Robinson et al. | |
| 6,498,101 B1 | 12/2002 | Wang | |
| 6,612,916 B2 | 9/2003 | Kollodge et al. | |
| 6,794,605 B2 * | 9/2004 | Park et al. | 219/121.69 |
| 6,986,705 B2 | 1/2006 | Preston et al. | |
| 7,020,306 B2 * | 3/2006 | Hirose et al. | 382/108 |
| 7,192,340 B2 | 3/2007 | Ono et al. | |
| 2001/0035354 A1 | 11/2001 | Ashjaee et al. | |
| 2001/0039175 A1 | 11/2001 | Golzarian et al. | |
| 2002/0173255 A1 | 11/2002 | Shendon et al. | |
| 2003/0132120 A1 | 7/2003 | Emesh et al. | |
| 2003/0153245 A1 | 8/2003 | Talieh et al. | |
| 2003/0209528 A1 * | 11/2003 | Choo et al. | 219/121.72 |
| 2004/0110381 A1 * | 6/2004 | Yoshida | 438/692 |
| 2004/0166779 A1 | 8/2004 | Balijepalli et al. | |
| 2004/0232121 A1 * | 11/2004 | Park et al. | 219/121.69 |
| 2006/0079159 A1 | 4/2006 | Naujok et al. | |

FOREIGN PATENT DOCUMENTS

JP 2001071256 * 3/2001

OTHER PUBLICATIONS

Bajaj, Rajeev, PCT/US05/35979 filed Oct. 5, 2005, International Search Report and Written Opinion, Feb. 24, 2006, 8pp, International Searching Authority-US, Alexandria, Virginia.
Bajaj, Rajeev, PCT/US05/35732 filed Oct. 5, 2005, International Search Report and Written Opinion, Nov. 28, 2006, 6pp, International Searching Authority-US, Alexandria, Virginia.
Bajaj, Rajeev, PCT/US05/35660 filed Oct. 5, 2005, International Search Report and Written Opinion, Jun. 15, 2007, 8pp, International Searching Authority-US, Alexandria, Virginia.
Bajaj, Rajeev, PCT/US05/35978 filed Oct. 5, 2005, International Search Report and Written Opinion, Mar. 15, 2006, 10pp, International Searching Authority-US, Alexandria, Virginia.

* cited by examiner

*Primary Examiner*—Eileen P. Morgan
(74) *Attorney, Agent, or Firm*—Sonnenschein Nath & Rosenthal LLP

(57) ABSTRACT

A polishing pad conditioning apparatus includes a laser beam generating unit along with a system to transmit or focus the beam. The unit is mounted on a conditioning arm, such that the laser beam may be directed perpendicular to the plane of the polishing pad, which is next to the polishing platen. The conditioning arm is capable of moving across the polishing table to scan the pad radius, allowing the laser to traverse the pad radius.

8 Claims, 2 Drawing Sheets

PAD CONDITIONER DESIGN AND METHOD OF USE

RELATED APPLICATIONS

This application is a NONPROVISIONAL of, claims priority to and incorporates by reference, U.S. Provisional Application 60/659,384, filed Mar. 7, 2005.

FIELD OF THE INVENTION

The present invention relates to the field of chemical mechanical planarization (CMP) and relates specifically to CMP pad conditioning apparatus and method of use.

BACKGROUND

In modern integrated circuit (IC) fabrication, layers of material are applied to embedded structures previously formed on semiconductor wafers. Chemical mechanical planarization (CMP) is an abrasive process used to remove these layers and polish the surface of a wafer to achieve the desired structure. CMP may be performed on both oxides and metals and generally involves the use of chemical slurries applied in conjunction with a polishing pad in motion relative to the wafer (e.g., pad rotation relative to the wafer). The resulting smooth flat surface is necessary to maintain the photolithographic depth of focus for subsequent processing steps and to ensure that the metal interconnects are not deformed over contour steps. Damascene processing requires metal, such as tungsten or copper, to be removed from the top surface of dielectric using CMP to define interconnect structures.

Polishing pads are typically made of urethanes either in cast form (and filled with micro-porous elements) or from nonwoven felt coated with polyurethanes. During polishing, the pad surface undergoes deformation due to polishing forces. The pad surface therefore has to be "regenerated" through a conditioning process.

Conventional conditioning processes involve pressing a fine diamond covered disc against the pad surface while pad is rotated much like during polish process. One of the issues with diamond conditioning disks is that diamonds tend to loose their sharpness over time. The process is accelerated when diamond conditioning is used during wafer processing, as slurry chemicals tend to accelerate the wear.

Another problem with diamond conditioners is the attendant risk of diamonds getting loose and falling onto the pad. This can lead to severe damage to the semiconductor wafer resulting in loss of product. Further, diamond conditioners tend to be expensive and have a finite lifespan, therefore needing to be replaced after predetermined usage.

Hence, there exists a need for conditioning apparatus that does not suffer from disadvantages such as those discussed above and that provides repeatable performance at relatively low cost.

SUMMARY OF THE INVENTION

A polishing pad conditioning apparatus and method is described. The apparatus includes a laser beam generating unit and a system to transmit or focus the laser beam. The laser beam generating unit, or in some cases only the beam delivery unit, is mounted on a conditioning arm, such that the laser beam may be directed perpendicular to the plane of the polishing pad, which is next to a polishing platen. The conditioning arm is capable of moving across the polishing table to scan the pad radius, allowing the laser to traverse the pad radius. The beam is incident on the pad, creating a local deformation, the depth and shape of the deformation depends on the beam spot size and power. The beam may be traversed across the pad in a predetermined trajectory creating a desired micro grooving pattern. As the conditioning unit is traversed across the polish platen, onto which the polishing pad is mounted, the platen is rotated thereby allowing the beam to cover the entire pad. The rotation speed of the pad, traversing speed of the laser conditioning head, and rotation speed of the laser head unit itself can be varied to provide the desired micro groove pattern.

In varying embodiments of the present invention, the laser beam is mounted off-center from the conditioning head and is capable of rotation, which when combined with the pad rotation and traversing motion of the conditioning unit, can create multiple micro grooving patterns. In yet another embodiment, multiple beam units may be mounted on the conditioning head enabling multiple points to create the micro grooving texture rapidly and more uniformly.

In other embodiments, the laser beam may impinge the pad at a non-normal angle. This creates an angled microgroove pattern, which may be desirable in certain cases.

BRIEF DESCRIPTION OF THE DRAWINGS

The present invention is illustrated by way of example, and not limitation, in the figures of the accompanying drawings, in which.

DETAILED DESCRIPTION

The present invention relates to the design and method of a non-contact polishing pad conditioning unit. The design involves a laser beam generating unit, and beam transmission and delivery optics as necessary. The entire unit or only the beam delivery hardware (e.g., a laser conditioning head) is mounted on a movable arm, capable of traversing the radius of the polishing pad, which is mounted onto a polishing table. In some cases the laser-conditioning head may be mounted such that beam is off-center on the conditioning plate, which is capable of rotating. A rotating beam thus impinges on the pad surface creating circular grooving patterns. This when coupled with pad rotation and traversing the beam across the radius of the pad, creates a micro groove pattern across the entire pad surface.

It is possible to use several types of laser units in this application such as a $CO_2$ laser, diode lasers, Nd-YAG laser, etc. Typical $CO_2$ lasers used to cut or engrave plastics are in the range of 10-50 watts.

Another aspect of conditioning is that the polishing pads are wet during processing. $CO_2$ lasers have wavelengths of 10.6 microns which make them well suited for transmitting energy to water molecules. Water heats up instantaneously and boils off rupturing the polymer surface with it. This process in combination with ability to cut polymer itself creates unique microgroove texture on the pad surface. Laser conditioning hardware solves several problems, most notably the pad conditioning process is very repeatable and stable. By eliminating diamond-conditioning disk, the risk of diamond loss is eliminated. This failure mode causes scratches on the product wafers resulting in catastrophic product loss and equipment down time. Also lasers are repeatable, long lasting and low cost method to producing micro grooving on the pad surface, eliminating diamond-conditioning disk, which is an expensive consumable with short life.

Figure 1A:
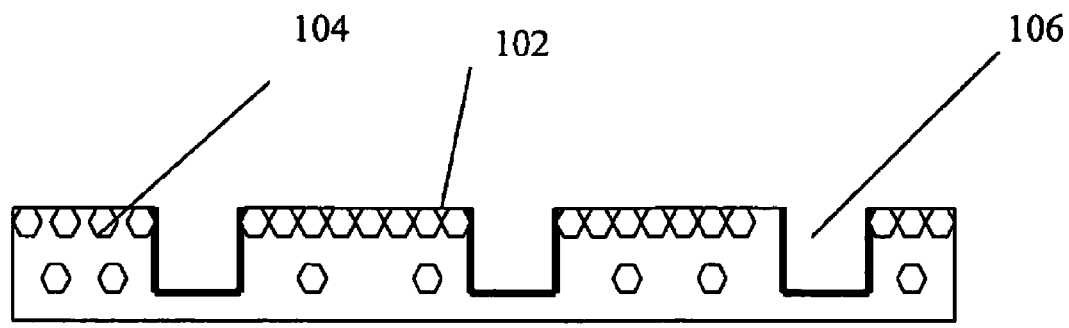
FIG. 1A illustrates a side cutaway view of a polishing pad.
Figure 1B:
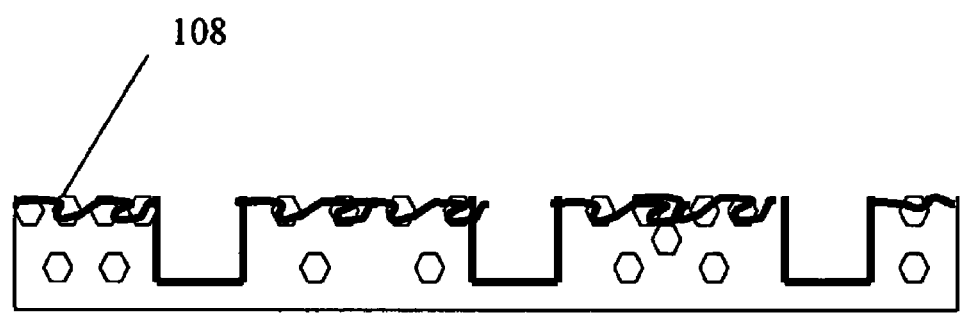
FIG. 1B shows the surface of the polishing pad illustrated in FIG. 1A after polishing.
Figure 1C:
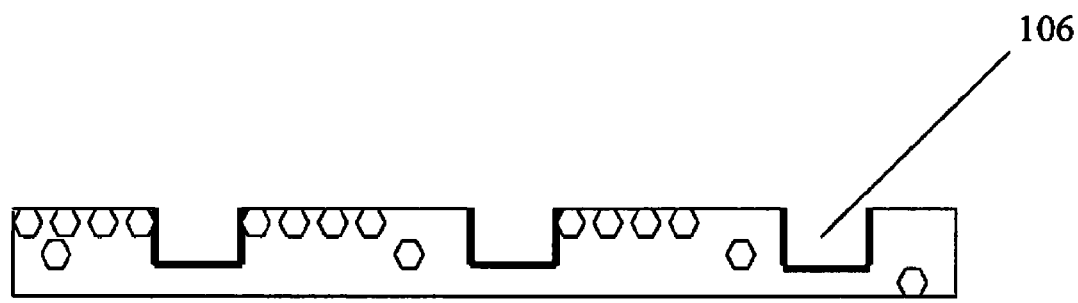
FIG. 1C shows the surface of the polishing pad illustrated in FIG. 1B after a conditioning process has been completed.

FIG. 1A illustrates a side cutaway view of a polishing pad. Polishing pad 102 contains microelements 104, and grooves 106, much like commercial polishing pads such as the IC1000 of Rhom & Haas, Inc. FIG. 1B shows the surface of the polishing pad 102 after polishing. The top surface of the pad shows degradation 108, especially around the microelements where the edges are degraded due to plastic or viscous flow of the bulk urethane material. FIG. 1C shows the surface of the polishing pad 102 after the conditioning process has been completed. Conditioning accomplishes two things, it wears off the top degraded surface and also recreates the microgrooves 106 to aid in slurry transport.

Figure 2A:
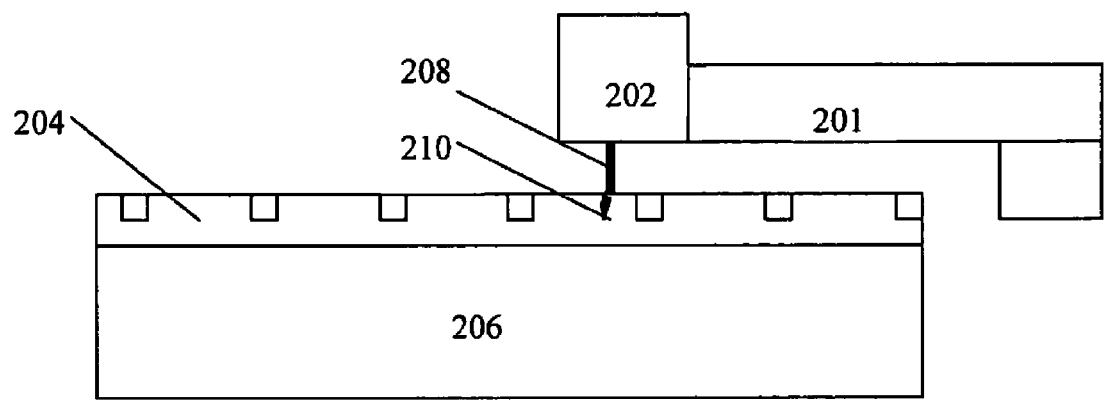
FIG. 2A illustrates a laser delivery unit on a conditioning arm mounted adjacent to a polishing pad on a polish table in accordance with an embodiment of the present invention.
Figure 2B:
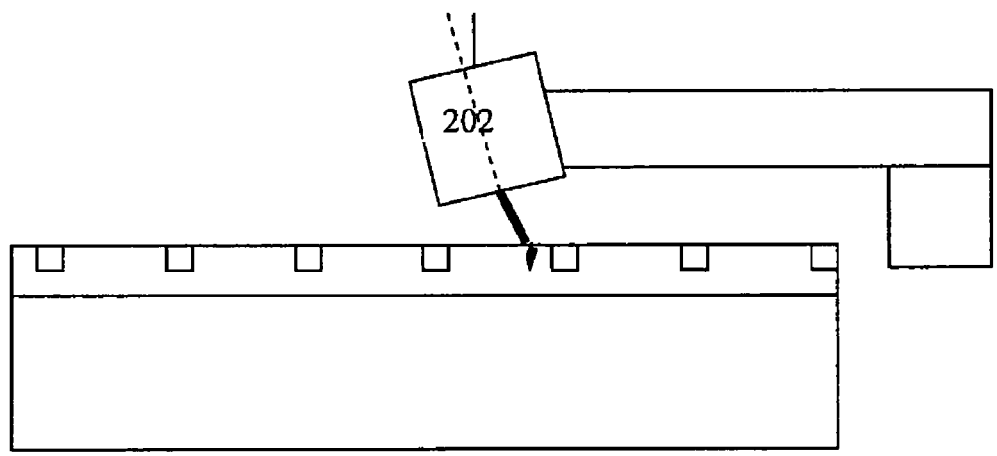
FIG. 2B shows the laser conditioning unit illustrated in FIG. 2A mounted at a non normal angle to the polishing pad.
Figure 2C:
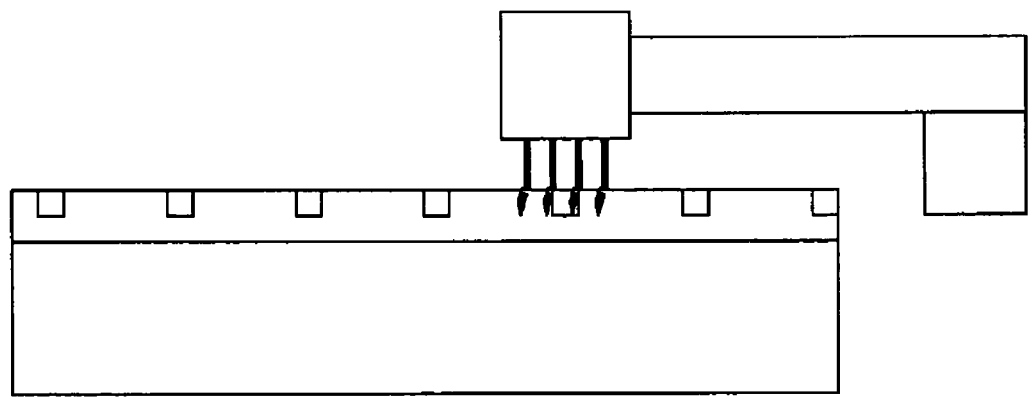
FIG. 2C illustrates the laser conditioning unit with multiple beams incident on the pad.

FIG. 2A illustrates laser delivery unit 202 on conditioning arm 201, mounted adjacent to the polishing pad 204 on polish table 206. Laser beam 208 is incident on the polish pad resulting in micro-grooves 210. FIG. 2B shows the laser-conditioning unit 202 mounted at a non normal angle to the polishing pad. FIG. 2C shows the laser conditioning unit with multiple beams incident on the pad.

Thus, a pad conditioning apparatus having a laser source (e.g., a laser diode, $CO_2$ laser, solid state laser, etc.) with at least one beam capable of traversing the pad surface at a given rate has been described. The laser power is adjustable to create a micro groove pattern on the pad surface. The laser beam may be mounted off-center to the conditioning head and/or directed so as to be perpendicular to the plane of the polishing pad. Indeed, the laser beam may be mounted at any angle to the plane of polishing pad. Preferably the laser source has a power in the range of 1-500 watts, and is capable of traversing the pad surface at a rate of 1-500 mm/sec while the pad is rotated at 10-500 rpm, to create a micro groove pattern on the pad surface to affect pad conditioning.

One method of conditioning the polishing pad involves bringing the pad conditioning head in close proximity to the pad surface while traversing the pad radius with the laser beam and rotating the pad with respect to said beam to effect full pad coverage, creating a microgroove pattern in the pad. A further method involves bringing the pad conditioning head in proximity to the pad surface while polishing the wafer, e.g., by pressing the wafer against the polishing pad, so as to continually refresh the pad surface microgrooves thereby maintaining process performance.

What is claimed is:

1. A pad conditioning apparatus comprising a laser source mounted to (i) condition a polishing pad with at least one laser beam while said polishing pad is polishing a wafer, and (ii) to traverse a polishing surface of the polishing pad during said polishing of the wafer.

2. The apparatus as in claim 1, wherein the laser source is mounted off-center with respect to the polishing pad on a conditioning head.

3. The apparatus as in claim 1, wherein the laser source is mounted such that the at least one laser beam is incident perpendicular to a plane of polishing pad.

4. The apparatus as in claim 1, wherein the laser source is mounted such that the at least one laser beam is incident at an angle other than 90 degrees to a plane of the polishing pad.

5. The apparatus as in claim 1, wherein the laser source comprises one of a diode, a $CO_2$ or a solid state laser source having power in the range of 1-500 watts.

6. The apparatus as in claim 1, wherein the laser source is mounted so as to be capable of traversing the surface of the pad at a rate of 1-500 mm/sec.

7. The apparatus as in claim 1, wherein the pad is supported so as to be capable of being rotated at 10-500 rpm.

8. A method, comprising bringing a polishing pad conditioning head in proximity to a surface of a polishing pad and directing a laser beam from the polishing pad conditioning head onto the surface of the polishing pad so as to traverse a radius of the polishing pad with the laser beam while rotating the polishing pad so as to effect full pad coverage and create a microgroove pattern in the surface of the polishing pad while a wafer is being pressed against the polishing pad.

* * * * *